US008477965B2

(12) United States Patent
Radford

(10) Patent No.: US 8,477,965 B2

(45) Date of Patent: Jul. 2, 2013

(54) SYSTEM AND METHOD FOR AUDIO MIXING

(75) Inventor: Sheldon Thane Radford, San Francisco, CA (US)

(73) Assignee: Avid Technology, Inc., Burlington, MA (US)

( * ) Notice: Subject to any disclaimer, the term of this patent is extended or adjusted under 35 U.S.C. 154(b) by 338 days.

(21) Appl. No.: 12/756,335

(22) Filed: Apr. 8, 2010

(65) Prior Publication Data

US 2010/0266147 A1 Oct. 21, 2010

Related U.S. Application Data

(60) Provisional application No. 61/170,703, filed on Apr. 20, 2009.

(51) Int. Cl.
*H04B 1/00* (2006.01)
*G10H 1/00* (2006.01)

(52) U.S. Cl.
USPC .......................................... 381/119; 381/118

(58) Field of Classification Search
USPC .................. 381/118, 119, 61; 715/716–732, 715/500.1; 369/3, 4; 700/94
See application file for complete search history.

(56) References Cited

U.S. PATENT DOCUMENTS

| | | | | |
|---|---|---|---|---|
| 5,402,501 | A * | 3/1995 | Silfvajt et al. | 381/119 |
| 7,024,677 | B1 * | 4/2006 | Snyder et al. | 725/86 |
| 7,302,644 | B2 * | 11/2007 | Holtz et al. | 715/720 |
| 7,742,609 | B2 * | 6/2010 | Yeakel et al. | 700/94 |
| 2002/0186233 | A1 * | 12/2002 | Holtz et al. | 345/716 |
| 2004/0030425 | A1 * | 2/2004 | Yeakel et al. | 700/94 |

OTHER PUBLICATIONS

Innovason Eclipse Mixing Console Data Sheet, Sep. 2008, 3 pages.

* cited by examiner

*Primary Examiner* — Fan Tsang
*Assistant Examiner* — Eugene Zhao
(74) *Attorney, Agent, or Firm* — Oliver Strimpel

(57) ABSTRACT

Methods and systems for assigning functionality to a plurality of physical input controls of an audio mixing system involve: providing an interface for enabling an operator to select one of a plurality of audio channels and one of a plurality of mixing functional areas, wherein each of the plurality of mixing functional areas includes a plurality of audio mixing functions associated with the functional area; receiving an indication of a selection of one of the plurality of channels by an operator using the interface; receiving an indication of a selection of one of the plurality of audio mixing functional areas by an operator using the interface; and for each of the plurality of physical controls: assigning the physical control to control, for the selected channel, one of the plurality of audio mixing functions associated with the selected audio mixing functional area; and displaying a visual indication of the assigned function.

18 Claims, 5 Drawing Sheets

SYSTEM AND METHOD FOR AUDIO MIXING

CROSS REFERENCE TO RELATED APPLICATION

This application claims the benefit of priority to U.S. provisional patent application Ser. No. 61/170,703, filed Apr. 20, 2009, entitled "System and Method for Audio Mixing", the contents of which is incorporated herein by reference.

BACKGROUND

Mixing consoles provide an operator with the ability to access and adjust many groups of controls for each of multiple audio channels. In the case of live mixing consoles, the operator needs fast access to the controls for each channel. On traditional analog mixing consoles, individual controls are grouped into functional areas, such as input, equalizer, dynamics, and auxiliary send. These controls are repeated for each channel strip, which result in a large work surface as well as a complex and potentially confusing user interface.

Digital mixing consoles attempt to mitigate the problem of large and complex work surfaces by using a single channel strip approach, in which an operator selects a channel and then accesses and controls the parameters of the selected channel using a single set of dynamically updated functional controls for each of the functional areas corresponding to the currently selected channel. This avoids the need to have a dedicated set of controls for each channel.

SUMMARY

Embodiments of the invention provide methods and systems for selecting, customizing, and assigning functionality to encoders in an audio mixing system. The invention features a soft-assignable channel strip which includes a single channel strip that can be soft-assigned to encode and/or display parameters of any selected channel and any selected functional area corresponding to the selected channel.

In general, in one aspect, a method for assigning functionality to a plurality of physical inputs of an audio mixing system includes: providing an interface for enabling an operator to select one of a plurality of audio channels and one of a plurality of mixing functional areas, wherein each of the plurality of mixing functional areas includes a plurality of audio mixing functions associated with the functional area; receiving an indication of a selection of one of the plurality of channels by an operator using the interface; receiving an indication of a selection of one of the plurality of audio mixing functional areas by an operator using the interface; and for each of the plurality of physical controls: assigning the physical control to control, for the selected channel, one of the plurality of audio mixing functions associated with the selected audio mixing functional area; and displaying a visual indication of the assigned function.

Various embodiments include one or more of the following features. The assigned audio mixing function is a predetermined one of the audio mixing functions associated with the selected audio mixing functional area. The method further includes receiving an indication of operator selection of one of the audio mixing functions associated with the selected audio mixing functional area, and the assigned function is the audio mixing function selected by the operator. A visual indication of the selected audio mixing functional area is displayed adjacent to the physical controls. The assigned function enables an operator to control or display an audio parameter with the physical control. The audio mixing functional areas includes at least one of input functions, equalizer functions, compressor and limiter functions, expander and gate functions, and auxiliary send controls. The plurality of physical controls includes one or more rotatable knobs connected to rotary encoders. The interface includes a plurality of buttons, wherein pressing one of the plurality of buttons selects one of the plurality of functional areas.

In general, in another aspect, a method for assigning functionality to a plurality of physical controls of an audio mixing system, the method includes: providing an interface for enabling an operator to select one of a plurality of audio channels, one of a plurality of mixing functional areas, and one of a plurality of mixing functions associated with a selected one of the plurality of mixing functional areas; receiving an indication of a selection of one of the plurality of channels by an operator using the interface; receiving an indication of a first one of the plurality of audio mixing functional areas and a first mixing function associated with the first one of the plurality of audio mixing functional areas by an operator using the interface; assigning a first one of the plurality of physical controls to control, for the selected channel, the first mixing function; receiving an indication of a second one of the plurality of audio mixing functional areas and a second mixing function associated with the second one of the plurality of audio mixing functional areas by an operator using the interface; assigning a second one of the plurality of physical controls to control, for the selected channel, the second mixing function, wherein the first mixing functional area is different from the second mixing functional area; and displaying a visual indication that associates the first and second ones of the plurality of physical controls with the audio mixing functional areas and the audio mixing functions respectively assigned to them.

In general, in yet another aspect, an audio mixing system includes: a plurality of physical controls, each of the controls being connected to an electronic encoder; an interface for enabling an operator to select one of a plurality of audio channels and to select one of a plurality of audio mixing functional areas; a display for indicating to the operator a function that is assigned to each of the plurality of physical controls; a computer-readable memory storing program instructions; a processor in communication with the controls, the interfaces, the display, and computer-readable memory, wherein the program instructions, when processed by the processor, instruct the processor to: receive an indication of a selection of one of the plurality of channels by the operator using the interface; receive an indication of a selection of one of the plurality of audio mixing functional areas by the operator using the interface; and for each of the plurality of physical controls: assign the physical control to control, for the selected channel, one of the plurality of audio mixing functions associated with the selected audio mixing functional area; and cause the display to indicate the assigned function.

Various embodiments include one or more of the following features. The audio mixing function that is assigned to the physical control is a predetermined one of the audio mixing functions associated with the selected audio mixing functional area. The computer-readable instructions further instruct the processor to receive an indication of operator selection of one of the plurality of audio mixing functions associated with the selected audio mixing functional area, and the audio mixing function that is assigned to the physical control is the audio mixing function selected by the operator. The computer-readable instructions further instruct the processor to display, for each of the plurality of physical controls, a visual indication of the selected audio mixing functional area. The visual indication is a predetermined color assigned to the selected functional area and is displayed in an area adjacent to the physical control. The plurality of audio mixing functional areas includes at least one of input functions, equalizer functions, compressor and limiter functions, expander and gate functions, and auxiliary send controls. The plurality of physical controls includes one or more rotatable knobs connected to rotary encoders. The interface includes a plurality of buttons, wherein pressing one of the plurality of buttons selects one of the plurality of functional areas.

DETAILED DESCRIPTION

The described embodiment features a "soft" channel strip within an audio mixing console. In a system equipped with a soft channel strip, the operator selects a channel and a processing function, and the soft channel strip then assigns functions to the encoders that correspond to the selected processing function. In such a system, only a single set of soft-assignable encoders and associated text displays is required in order to control each of the channels with respect to each of the audio mixing functional areas. An advantage of such a system is a major reduction in the size and complexity in the audio mixing console interface compared to those of analog mixing consoles or traditional digital mixing consoles. Furthermore, the reduction of the number of controls is achieved without sacrificing the ability of an operator to access key parameters rapidly. Another feature includes the ability to combine individual controls from different functional areas to create a user-specified parameter group that provides "top level" access to key parameters. Visual feedback features the use of color to indicate the functional area of the parameter assigned to each encoder together with an alphanumeric parameter name display and a value readout. The user interface also provides one-button access to any functional area as well as to a user-defined parameter set.

Figure 1:
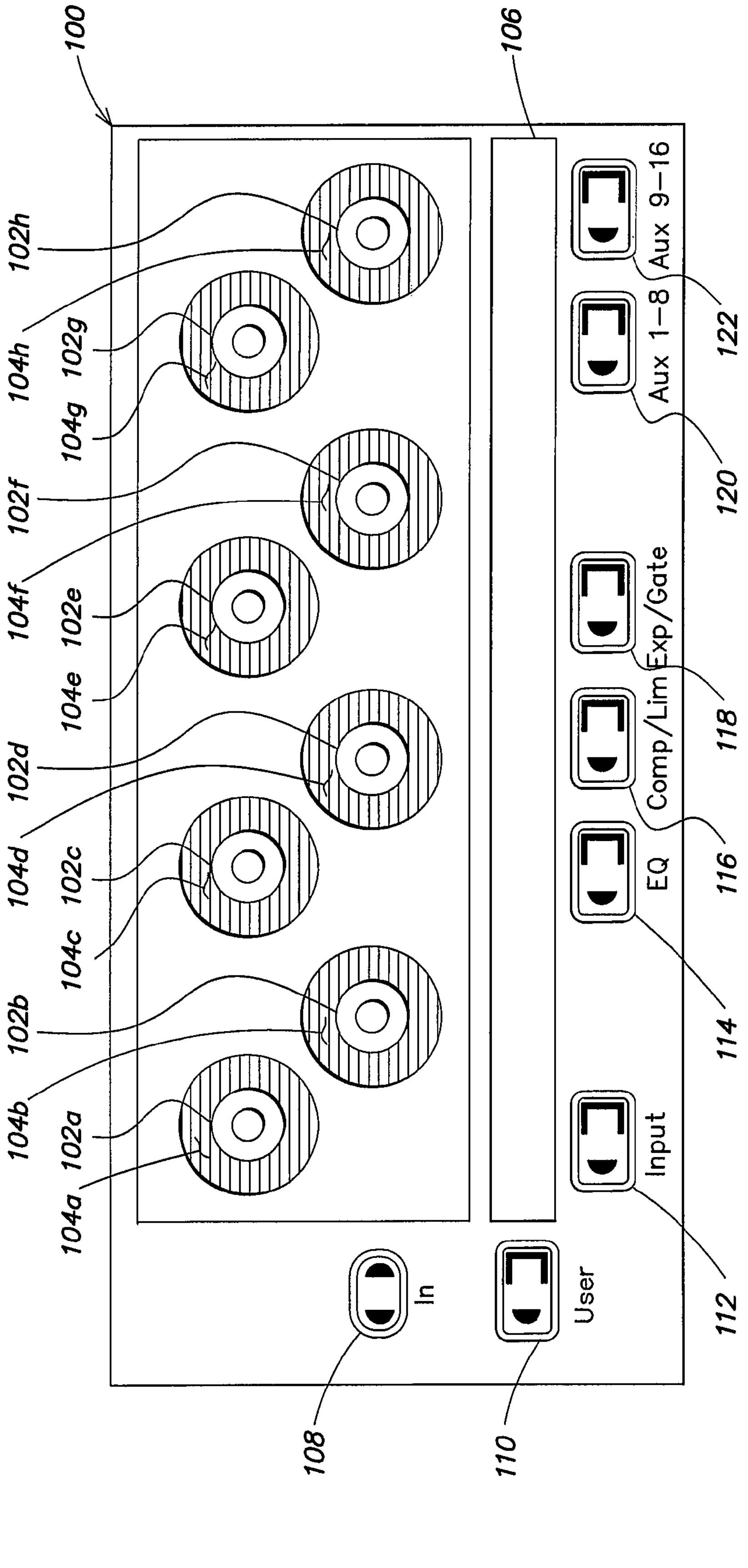
FIG. 1 is an illustration of a soft channel strip according to the described embodiment.

FIG. 1 is an illustration of soft channel strip 100 which includes a set of soft-assignable encoders 102*a-h*. The strip includes eight physical input controls; in various embodiments the physical controls are rotary knobs connected to rotary encoders, or sliders or faders connected to linear encoders. Combinations of rotary and linear controls may also be used. Depending on the application, the number of encoders on soft encoder channel strip ranges from about two to about twenty. In the described embodiment, each soft-assignable encoder includes a rotatable physical input control knob connected to a digital encoder. Each soft-assignable encoder is ringed by a set of discrete LEDs (not shown) that indicate the current parameter value and/or position, as well as other functions or modes such as on/off, bell/shelf, etc. Also associated with each encoder is a color indicator 104*a*-104*h*, such as one or more tricolor LEDs, that light up in a predetermined color to indicate the functional area currently assigned to that encoder. The operator can choose the colors to assign to each functional area. LCD display 106, positioned below the encoders, displays the currently assigned parameter names and values corresponding to encoders 102*a*-102*h*. Display 106 can be made of other display technologies, including plasma or LEDs, and can be monochrome or color.

Soft channel strip 100 also includes several buttons or switches that an operator uses to assign the functionality of the soft encoders. "In" button 108 is used to determine whether selected function is in the circuit or not. "User" button 110 is used to select and program encoder combinations customized to a particular user. "Input" button 112 enables the operator to assign channel strip 100 encoders to control input functions. The operator selects other functional areas using the following buttons: EQ button 114 for the EQ functional area, Comp/Lim button 116 for the compression/limit functional area, Exp/Gate button 118 for the expansion/gate functional area, Aux 1-8 button 120 for auxiliary send channels 1-8 and Aux 9-16 button 122 for the auxiliary send channels 9-16. We discuss the operations of these buttons and switches in more detail below.

Figure 2:
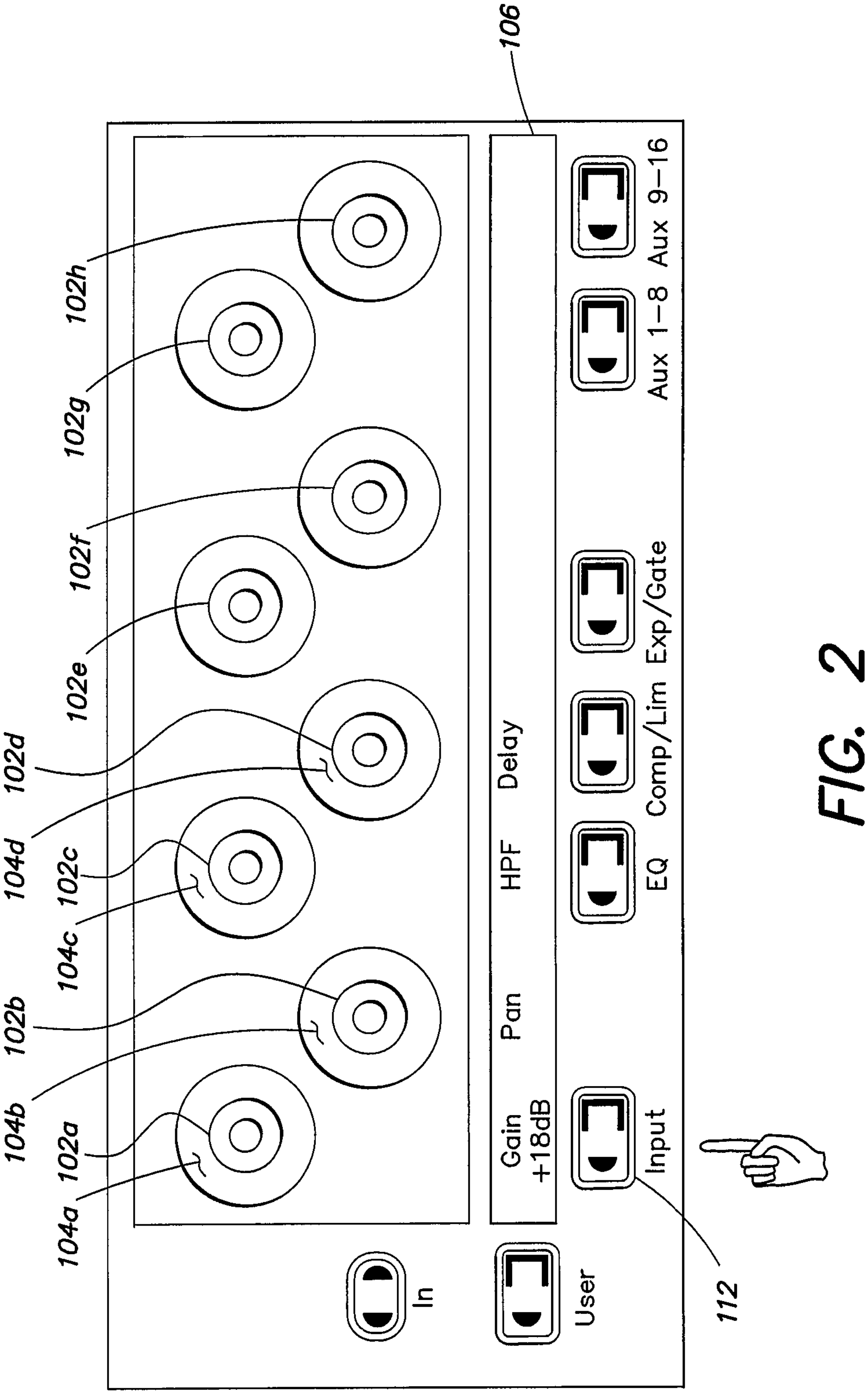
FIG. 2 is an illustration of the assignment of the soft channel strip of FIG. 1 to the input functional area.

FIG. 2 shows an exemplary assignment of the soft encoders when the operator selects the input functional area via input button 112. Color indicators 104*a*, 104*b*, 104*c*, and 104*d* are set to a predetermined color, e.g., white, indicating the input functional area. Encoder 102*a* is assigned to control the gain, encoder 102*b* is assigned to pan, encoder 102*c* to the high pass filter (HPF), and encoder 102*d* to delay, with encoders 102*e-h* are unassigned. The parameter names and current parameter values are displayed below each assigned encoder in LCD display 106.

Figure 3:
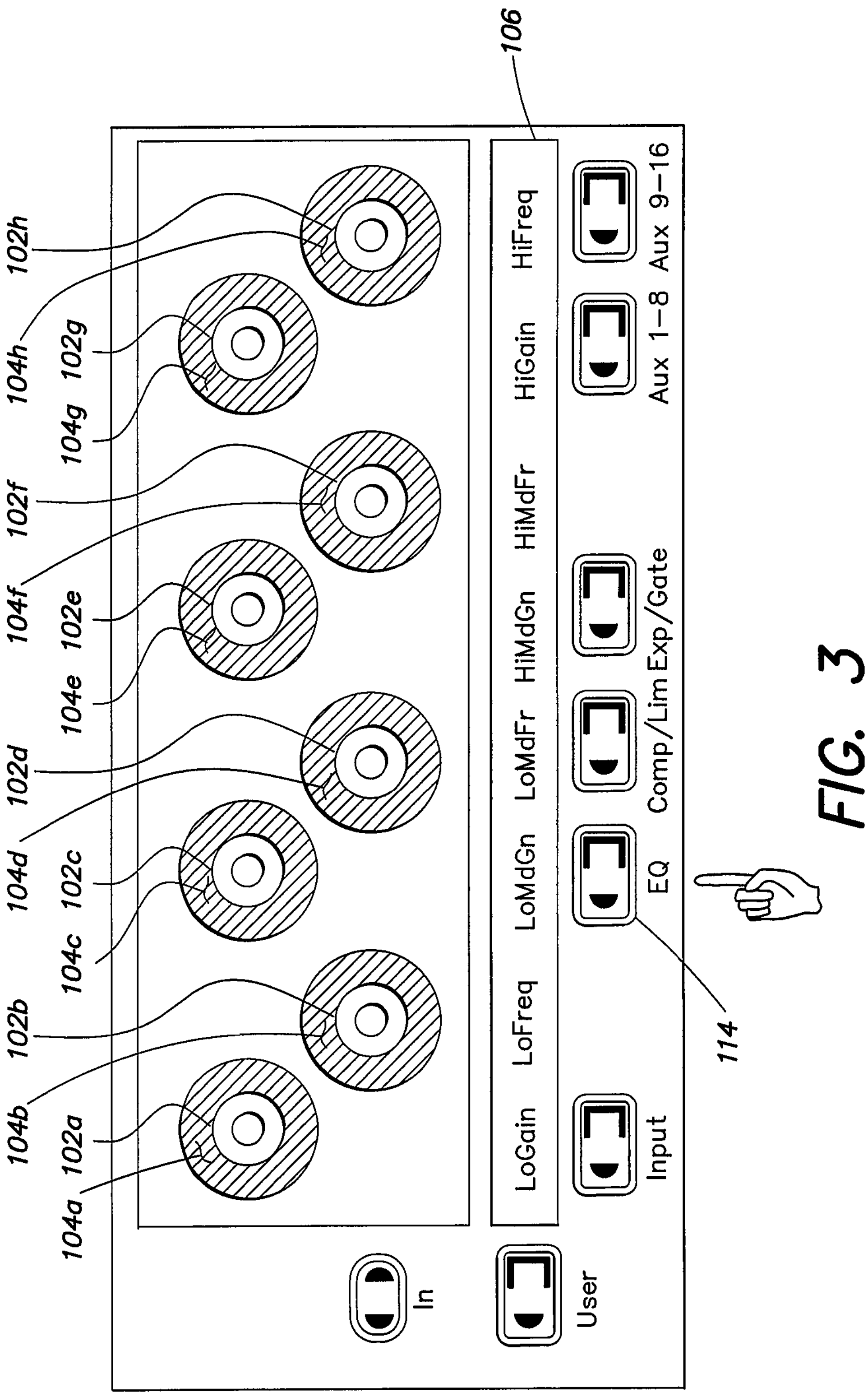
FIG. 3 is an illustration of the assignment of the soft channel strip of FIG. 1 to the equalization functional area.

FIG. 3 illustrates an exemplary assignment of the soft encoders when the operator selects the equalizer (EQ) functional area using EQ button 114. In this case, all eight soft encoders are assigned to control a parameter, and color indicators 104*a-f* are set to a predetermined color designating the EQ functional area, e.g., green. As shown in LCD display 106, soft encoders 102*a-h* are respectively assigned to control low frequency gain, low frequency range, low-mid frequency gain, low-mid frequency range, high-mid frequency gain, high-mid frequency range, high frequency gain, and high frequency range. Display 106 displays the current parameter values below the corresponding parameter name. In addition to operating as rotatable encoders, encoders 102*a*-102*h* each include a switch (not shown) that is operated by pressing the encoder. Pressing the switch causes the system to assign an alternate, related set of controls to the soft channel strip. For example, when functional area EQ is selected, pressing an encoder allows the operator to control the bandwidth (Q) assigned to each encoder.

Further soft channel assignments are as follows. Selecting the compressor/limiter functional area using Comp/Lim button 116 causes the system to assign encoders 102*a-f* to control threshold, ratio, attack, knee, release, and gain functions respectively, and displays the corresponding parameter names in LCD display 106. The system also sets color indictors 104*a-f* to a predetermined color, e.g., blue. Selecting the expander/gate functional area using Exp/Gate button 118 (FIG. 1) causes the system to assign encoders 102*a-f* to control threshold, ratio, attack, hold, release, and range respectively. Encoders 102*g* and 102*h* are also used for both the Comp and Gate functions to control the sidechain (i.e., key) low- and high-pass filters. Selecting the auxiliary send 1-8 functional area using Aux 1-8 button 120 causes the system to assign Aux 1 to encoder 102*a*, Aux 2 to encoder 102*h*, etc., with a similar assignment being made when Aux 9-16 button 122 is selected.

The operator can customize the assignment of functions to the soft channel strip so as to tailor the strip to what is needed for a particular application. In making custom assignments, the operator is not limited to a particular functional area, and can assign encoders to control parameters drawn from different functional areas. For example, an operator who is mixing sound during a live performance may need to access a subset of parameters frequently and rapidly once the performance is under way. Assigning the soft channel strip encoders to control that subset of parameters can help the operator take needed action quickly and reduce the risk of confusion and error.

Figure 4:
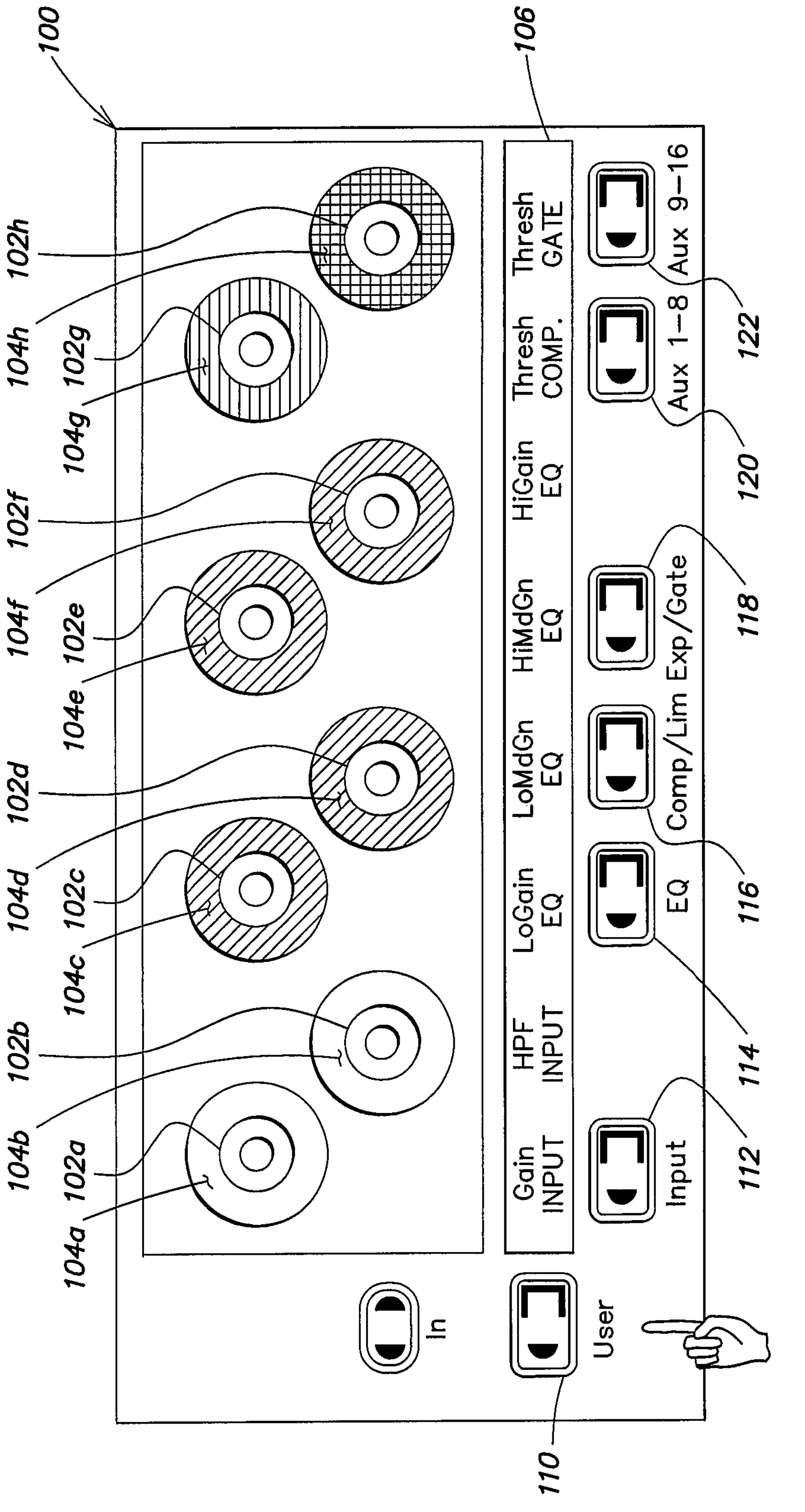
FIG. 4 is an illustration of a user-defined layout of the soft channel strip of FIG. 1.

FIG. 4 illustrates customization of soft channel strip 100 in which audio mixing functions associated with different audio mixing functional areas are assigned to the various input control encoders of the soft channel strip. In an illustrative interface to create a custom assignment, the operator presses user button 110. The operator presses and holds user button 110 until it flashes, and then rotates an encoder the desired parameter is shown in display 106. The operator then presses the encoder to lock in the selection, and then moves to the next encoder. Once the user-defined layout is complete, the operator presses user button 110 again to confirm and exit. To short-cut the cycling through all parameter, the operator can press one of functional area buttons 112, 114, 116, 118, 120, 122 to jump to that group of parameters. FIG. 4 shows an example of a user-defined layout in which soft encoders 102*a*-*h* are assigned to control parameters drawn from different functional areas as follows: encoders 102*a* and 102*b* control input functions gain and HPF respectively, with color indicators 104*a* and 104*b* displaying the predetermined color representing the input functional area, e.g., white; encoders 102*c*, 102*d*, 102*e*, and 102*f* control the EQ parameters low gain, low-mid gain, high-mid gain, and high gain respectively, with color indicators 104*c*, 104*d*, 104*e*, and 104*f* set to the color designating the EQ functional area, e.g., green; encoder 102*g* controls the Compressor (Comp) threshold parameter, with 104*g* set to a Comp functional area color, e.g., blue; and encoder 102*h* controls the Gate threshold parameter, with 104*g* set to a gate color, e.g., yellow.

In some embodiments, a software interface to the audio mixing console is used in order to help speed up the assignment of encoders to parameters. The operator double-presses user button 110 to enter the user assign mode, presses one of the channel encoders to select it for assignment, and then, using an on-screen software interface, clicks to select a parameter to be mapped to the selected channel control encoder. The operator continues to click other parameters, each click assigning that parameter to the next sequential channel control encoder. The operator presses the user button again to exit the assign mode and store the assignments.

The methods and systems described herein for assigning functionality to the physical input controls of the soft channel strip are not limited to the specific interfaces and programming steps that characterize the described embodiment. The physical input controls may include a combination of push buttons, sliders, rotary knobs, and touch-sensitive regions and displays. Various embodiments support any sequence of steps and input interfaces that enable an operator to assign each of the encoders in the channel strip to control a selected mixing function associated with a selected functional area for a selected channel.

Figure 5:
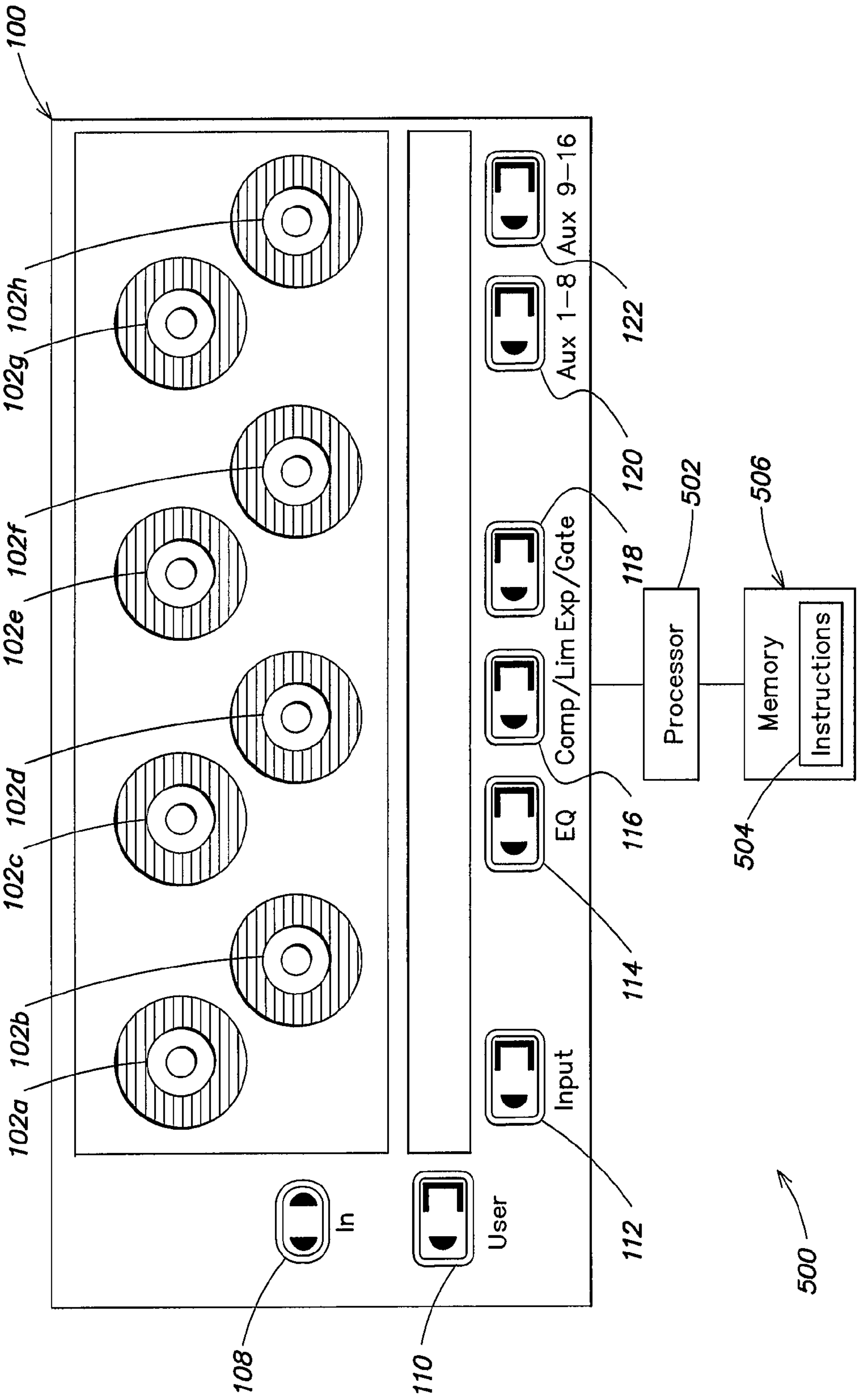
FIG. 5 is a high level block diagram of a hardware implementation of an audio mixing system according to the described embodiment.

FIG. 5 is a high level block diagram 500 of a hardware implementation of the described embodiment of a digital audio workstation that includes soft channel strip 100, processor 502 for executing computer-readable instructions 504, and memory 506 that includes stored computer-readable instructions 504 as well as other data and software. Soft channel strip 100 includes physical encoders 102*a*-*h*, display 106, and input buttons 108, 110, 112, 114, 116, 118, 120, and 122, as described above in connection with FIG. 1. The input buttons serve as an interface for an operator to select an audio mixing functional area. Together with encoders 102*a*-*b*, the input buttons also provide an interface for the operator to select a particular functionality to assign to one or more of encoders 102*a*-102*h*. Various embodiments may include a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

Memory 506 typically includes a computer readable medium. The medium may be volatile or nonvolatile, writeable or nonwriteable, and/or rewriteable or not rewriteable. A memory system stores data typically in binary form. Such data may define an application program to be executed by processor 502, or information stored on a disk to be processed by the application program. The invention is not limited to a particular memory system.

The audio mixing system described herein may be implemented in a combination of software, hardware and firmware. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network.

Various embodiments are suitable for use in any audio or video control surface, such those used in mixing consoles for live sound, professional and home studio recording, and for generating content for broadcast.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for assigning functionality to a plurality of physical controls of an audio mixing system, the method comprising:

providing an interface for enabling an operator to select one of a plurality of audio channels and one of a plurality of mixing functions, wherein each of the plurality of mixing functions includes a plurality of audio mixing parameters associated with the mixing function;

receiving an indication of a selection of one of the plurality of channels by an operator using the interface;

receiving an indication of a selection of one of the plurality of audio mixing functions by an operator using the interface; and for each of the plurality of physical controls:

assigning the physical control to control, for the selected channel, one of the plurality of audio mixing parameters associated with the selected audio mixing function such that operator adjustment of the physical control causes a change in value of the parameter; and displaying a visual indication of the assigned parameter.

2. The method of claim 1, wherein the assigned audio mixing parameter is a predetermined one of the plurality of audio mixing parameters associated with the selected audio mixing function.

3. The method of claim 1 further comprising receiving an indication of operator selection of one of the plurality of audio mixing parameters associated with the selected audio mixing function, and wherein the assigned parameter is the audio mixing parameter selected by the operator.

4. The method of claim 1, further comprising, for each of the plurality of physical controls, displaying a visual indication of the selected audio mixing function adjacent to the physical control.

5. The method of claim 1, wherein an operator is able to display a current state of an audio parameter with the physical control.

6. The method of claim 1, wherein the plurality of audio mixing functions includes at least one of input functions, equalizer functions, compressor and limiter functions, expander and gate functions, and auxiliary send controls.

7. The method of claim 1, wherein the plurality of physical controls includes one or more rotatable knobs connected to rotary encoders.

8. The method of claim 1, wherein the interface includes a plurality of buttons, wherein pressing one of the plurality of buttons selects one of the plurality of functions.

9. A method for assigning functionality to a plurality of physical controls of an audio mixing system, the method comprising:

providing an interface for enabling an operator to select one of a plurality of audio channels, one of a plurality of mixing functions, and one of a plurality of mixing parameters associated with a selected one of the plurality of mixing functions;

receiving an indication of a selection of one of the plurality of channels by an operator using the interface;

receiving an indication of a first one of the plurality of audio mixing functions and a first mixing parameter associated with the first one of the plurality of audio mixing functions by an operator using the interface;

assigning, a first one of the plurality of physical controls to control, for the selected channel, the first mixing parameter;

receiving an indication of a second one of the plurality of audio mixing functions and a second mixing parameter associated with the second one of the plurality of audio mixing functions by an operator using the interface;

assigning a second one of the plurality of physical controls to control, for the selected channel, the second mixing parameter, wherein the first mixing function is different from the second mixing function; and displaying a visual indication that associates the first and second ones of the plurality of physical controls with the audio mixing functions and the audio mixing parameters respectively assigned to them.

10. An audio mixing system comprising:

a plurality of physical controls, each of the controls being connected to an electronic encoder;

an interface for enabling an operator to select one of a plurality of audio channels and to select one of a plurality of audio mixing functions;

a display for indicating to the operator a parameter that is assigned to each of the plurality of physical controls;

a computer-readable memory storing program instructions;

a processor in communication with the controls, the interfaces, the display, and computer-readable memory, wherein the program instructions, when processed by the processor, instruct the processor to:

receive an indication of a selection of one of the plurality of channels by the operator using the interface;

receive an indication of a selection of one of the plurality of audio mixing functions by the operator using the interface; and for each of the plurality of physical controls:

assign the physical control to control, for the selected channel, one of the plurality of audio mixing parameters associated with the selected audio mixing function; and cause the display to indicate the assigned parameter.

11. The audio mixing system of claim 10, wherein the audio mixing parameter that is assigned to the physical control is a predetermined one of the plurality of audio mixing parameters associated with the selected audio mixing function.

12. The audio mixing system of claim 10, wherein the computer-readable instructions further instruct, the processor to receive an indication of operator selection of one of the plurality of audio mixing parameters associated with the selected audio mixing function, and wherein the audio mixing parameter that is assigned to the physical control is the audio mixing parameter selected by the operator.

13. The audio mixing system of claim 10, wherein the computer-readable instructions further instruct the processor to display, for each of the plurality of physical controls, a visual indication of the selected audio mixing function.

14. The audio mixing system of claim 13, wherein displaying the visual indication of the selected audio mixing function includes displaying a color indicative of the selected function in a display adjacent to the physical control.

15. The audio mixing system of claim 10, wherein an operator is able to display a current state of the audio mixing parameter assigned to the physical control.

16. The audio mixing system of claim 10, wherein the plurality of audio mixing functions includes at least one of input functions, equalizer functions, compressor and limiter functions, expander and gate functions, and auxiliary send controls.

17. The audio mixing system of claim 10, wherein the plurality of physical controls includes one or more rotatable knobs connected to rotary encoders.

18. The audio mixing system of claim 10, wherein the interface includes a plurality of buttons, wherein pressing one of the plurality of buttons selects one of the plurality of functions.

* * * * *